United States Patent Office 3,715,436
Patented Feb. 6, 1973

3,715,436
FORMIMIDO-ESTERS AND PESTICIDAL PREPARATIONS CONTAINING THEM
Stefan Janiak, Binningen, and Volker Dittrich, Basel, Switzerland, assignors to Ciba-Geigy AG, Basel, Switzerland
No Drawing. Original application Mar. 25, 1968, Ser. No. 715,494. Divided and this application Dec. 9, 1970, Ser. No. 96,589
Claims priority, application Switzerland, Mar. 28, 1967, 4,317/67
Int. Cl. A01n 9/20, 9/24
U.S. Cl. 424—304     3 Claims

ABSTRACT OF THE DISCLOSURE

The invention relates to new formimido-ester of the general formula

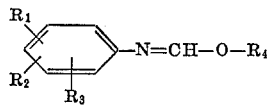

of which the substituents $R_1$ to $R_4$ are defined in the disclosure, and their use is pesticides, especially for combating insects, arachnoids and nematodes.

CROSS-REFERENCE TO RELATED APPLICATIONS

This is a division of application Ser. No. 715,494, filed Mar. 25, 1968, now abandoned.

The present invention relates to pesticidal preparations, especially preparations for combating insects, arachnoids and nematodes, which comprise as the active component, at least one formimido-ester of formula

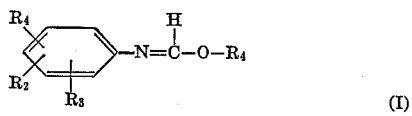

(I)

wherein $R_1$, $R_2$ and $R_3$ are identical or different and each represents a hydrogen or halogen atom, a lower alkyl, alkoxy, alkylthio or alkylsulphinyl group, a nitro, nitrile, thiocyanate and/or trifluoromethyl group, and $R_4$ represents an optionally substituted aliphatic group, together with a suitable carrier.

The preparations may contain one or more of the following additives: a solvent, a diluent, a dispersing agent, an emulsifier, a wetting agent, an adhesive, a thickener as well as further known pesticides.

The group $R_4$ may consist of a simple alkyl, alkenyl or alkinyl group, but may also contain further substituents, for example nitrile groups, halogen atoms, carbalkoxy or carboxamido groups.

The active substances of Formula I have an excellent insecticidal effect which applies to all stages of development of the insects, but surprisingly combats laid eggs especially well. Thus, for example, Prodenia eggs are 100% killed using small quantities of the preparations.

The new preparations are therefore of outstanding importance as ovicides for combating fresh generations of noctuids, diptera and arachnoids.

The combating can be especially well effected in the gaseous phase, in addition to direct contact action, for example, by spraying or dusting with sprays or dusting agents of the active substances. The present invention has considerable practical importance in combating plant pests in enclosed spaces, for example, in greenhouses, by using the preparations in the gaseous phase. If the atmosphere contained in the enclosed space is enriched with the pesticidal preparation by spraying, evaporation or vapourisation of an active substance, optionally in combination with other pesticides, then even covered parts of the plant or parts of the plant which with different applications are difficult to reach (undersides of leaves), and the pests located there, are reached over a longer period of time. Laid eggs are probably effectively combated because eggs have a surface which permits diffusion, and therefore takes up the active substance.

At the concentrations needed for this purpose, no phytotoxicity manifests itself.

The active substances of Formula I, however, furthermore possess microbiocidal effects, and are for example, effective against human-pathogenic and plant-pathogenic bacteria and fungi. Used in larger amounts, they also show a herbicidal effect.

More especially, the invention comprises active substances in which the phenyl nucleus is substituted by $R_1$, $R_2$ and $R_3$ in 2-, 4- and 5-position and which correspond to the formula

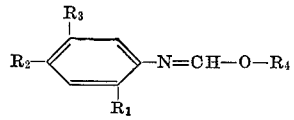

(II)

wherein $R_4$ represents a methyl or ethyl group and $R_1$, $R_2$ and $R_3$ independently of one another may represent a hydrogen, chlorine or bromine atom or a methyl, ethyl, methoxy or nitro group.

Amongst these compounds of Formula II there have proved to be especially effective those in which $R_4$ denotes a methyl or ethyl group, $R_5$ a methyl or methoxy group, a chlorine or hydrogen atom, and $R_6$ and $R_7$ independently of one another a methyl or methoxy group or a chlorine or bromine atom.

In order to combat pests in cotton cultures, for example for killing laid eggs of Prodenia litura, other active substances may be mixed with the preparations containing an active substance of general Formula I, for example, a compound of formula

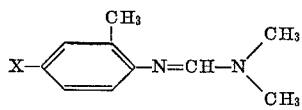

(III)

wherein X is a chlorine or bromine atom, and furthermore known phosphoric acid esters or insecticidally- acaricidally active carbamic acid esters.

The preparations containing the active substances of Formula I may, according to their intended use, be applied in the gaseous phase as well as in the usual manner, for example by means of sprays, dusting powders, wettable powders, granules and the like.

Materials that may be used for the manufacture of directly sprayable solutions of the compounds of general Formula I are for example: mineral oil fractions of high to medium boiling range, for example, diesel oil or kerosene, coal tar oil and oils of vegetable or animal origin, as well as hydrocarbons, for example alkylated naphthalenes, or tetrahydronaphthalene, optionally with the use of xylene mixtures, cyclohexanols, ketones and furthermore chlorinated hydrocarbons, for example trichlorethane and tetrachlorethane, trichlorethylene or trichlorobenzenes and tetrachlorobenzenes. It is advantageous to use organic solvents having boiling points above 100° C.

It is especially appropriate to prepare aqueous application forms from emulsion concentrates, pastes or wettable spraying powders by adding water. Emulsifiers or dispersing agents that may be used are non-ionic products, for example, condensation products of aliphatic alcohols, amines or carboxylic acids having a long-chain hydrocarbon residue containing about 10 to 20 carbon atoms with ethylene oxide, for example, the condensation product of octadecyl alcohol and 25 to 30 mols of ethylene oxide or that of soya fatty acid and 30 mols of ethylene oxide or that of technical oleylamine and 15 mols of ethylene oxide or that of dodecylmercaptan and 12 mols of ethylene oxide. Amongst the anionic emulsifiers which may be employed, there may be mentioned: the sodium salt of dodecyl alcohol sulphuric acid ester, the sodium salt of dodecylbenzenesulphonic acid, the potassium or triethanolamine salt of oleic acid or of abietic acid or of mixtures of these acids, or the sodium salt of a petroleum-sulphonic acid. Cationic dispersing agents that may be used are: quaternary ammonium compounds, for example cetyl pyridinium bromide or dihydroxyethyl benzyl dodecyl ammonium chloride.

When used for combating ectoparasites (for example blow flies) on useful animals, for example cattle, sheep or goats, dipping baths are advantageously used, in which the active substances are present by themselves or in the form described, as an emulsion or dispersion.

In order to manufacture dusting and scattering agents, there may be used as solid carrier substances: talc, kaolin, bentonite, calcium carbonate, calcium phosphate, and also charcoal, cork dust, wood flour and other materials of vegetable origin. It is also very appropriate to manufacture the preparations in granular form. The various forms in which the preparations are used may, in the usual manner, be provided with additions of substances which improve the distribution, adhesion, rain resistance or penetrating power; as such substances there may be mentioned: fatty acids, resin, glue, casein or alginates.

The preparations according to the invention may be used by themselves or together with conventional pesticides, especially insecticides, acaricides, nematocides, bactericides or further fungicides and/or herbicides.

The active substances of Formula I may be manufactured in a simple manner by heating an appropriately substituted aniline with an orthoformic acid ester. The reaction may be carried out in a solvent or diluent, for example, in acetonitrile.

Acid catalysts, for example hydrochloric acid dissolved in the alcohol corresponding to $R_4$, are used to accelerate the reaction.

The following examples illustrate the invention:

EXAMPLE 1

190 g. of ethyl orthoformate, 81 g. of 2,4-dichloraniline, 500 ml. of acetonitrile and 1 ml. of saturated alcoholic hydrochloric acid are initially introduced into a distillation apparatus. The mixture is heated for 5 hours at an external temperature of 100° C., whereupon acetonitrile and ethanol distil off. Thereafter, excess ethyl orthoformate is removed in a water-pump vacuum. The resulting N-2,4-dichlorophenyl-formimido-ethyl ester is distilled in a high vacuum.

Yield: 93 g.=79% [Compound No. 1]. Boiling point: 85° C./0.4 mm.

The following arylformimido-esters can be manufactured in the same manner:

| Compound No. | Structure | Boiling point |
|---|---|---|
| 2 | Cl-C₆H₃(CH₃)-N=CH-OC₂H₅ | 49-52°/0.04 mm. |
| 3 | 2-Cl, 3-CH₃-C₆H₃-N=CH-OC₂H₅ | 62-65°/0.05 mm. |
| 4 | 2-Cl, 3-CH₃-C₆H₃-N=CH-OC₂H₅ | 58-60°/0.03 mm. |
| 5 | 2,6-Cl₂-C₆H₃-N=CH-OC₂H₅ | 55°/0.03 mm. |
| 6 | 4-O₂N, 2-Cl-C₆H₃-N=CH-OC₂H₅ | 110°/0.02 mm. |
| 7 | 4-Cl, 2-NO₂-C₆H₃-N=CH-OC₂H₅ | 105°/0.04 mm. |
| 8 | 2,4-Cl₂-C₆H₃-N=CH-OC₂H₅ | 84°/0.03 mm. |
| 9 | 4-CH₃, 2-NO₂-C₆H₃-N=CH-OC₂H₅ | 88-90°/0.01 mm. |
| 10 | 4-O₂N, 2-CN-C₆H₃-N=CH-OC₂H₅ | 163°/0.01 mm. |
| 11 | 2,3-Cl₂-C₆H₃-N=CH-OC₂H₅ | 94-96°/0.01 mm. |
| 12 | 3,4-Cl₂ (with Cl) -C₆H₃-N=CH-OC₂H₅ | 95°/0.02 mm. |
| 13 | 2-CH₃, 3-NO₂-C₆H₃-N=CH-OC₂H₅ | 91-93°/0.02 mm. |
| 14 | 4-O₂N, 2-Cl, 5-CH₃-C₆H₂-N=CH-OC₂H₅ | ¹ 92-94° |
| 15 | 2-Cl, 6-OCH₃-C₆H₃-N=CH-OC₂H₅ | 115°/0.3 mm. |
| 16 | 2,6-(CH₃)₂-C₆H₃-N=CH-OC₂H₅ | 117-18°/11 mm. |
| 17 | 2,6-(CH₃)₂-C₆H₃-N=CH-OC₂H₅ | 118-20°/11 mm. |
| 18 | 4-CH₃, 2-CH₃-C₆H₃-N=CH-OC₂H₅ | 117-20°/11 mm. |

| Compound No. | Structure | Boiling point |
|---|---|---|
| 19 | Cl, Cl, Cl-C6H2-N=CH-OCH3 | 83°/0.03 mm. |
| 20 | Cl, Cl-C6H3-N=CH-OCH3 | 91°/0.1 mm. |
| 21 | Cl, Cl-C6H3-N=CH-OCH3 | 39-60°/0.29 mm. |
| 22 | Br, Br-C6H3-N=CH-OCH3 | 92-96°/0.08 mm. |
| 23 | Br, Br, Br-C6H2-N=CH-OC2H5 | 107°/0.08 mm. |
| 24 | CH3O, Cl, OCH3-C6H2-N=CH-OCH3 | 109-12°/0.04 mm. |
| 25 | CH3O, Cl, OCH3-C6H2-N=CH-OC2H5 | 123°/0.04 mm. |
| 26 | CH3, Cl, OCH3-C6H2-N=CH-OCH3 | 100-105°/0.04 mm. |
| 27 | CH3, Cl, OCH3-C6H2-N=CH-OC2H5 | 112-117°/0.04 mm. |
| 28 | H3C-C6H3(Cl)-N=CH-OCH3 | 56-60°/0.05 mm. |
| 29 | H3C-C6H3(Cl)-N=CH-OC2H5 | 67-69°/0.05 mm. |

[1] Melting point.

EXAMPLE 2

A mixture containing 20 g. of Compound No. 1, 10 g. of a condensation product of p-tert. octylphenol with about 10 mols of ethylene oxide, xylene and 10 g. of calcium p-dodecylbenzenesulphonate, is stirred. The batch is made up to 100 ccs. with xylene. A 20% strength emulsion concentrate is thus obtained, which can be diluted with water as desired to give stable emulsions.

EXAMPLE 3

Laid eggs of the noctuid *Prodenia litura* (F.) are cut out from the pieces of filter paper, which serve for the deposition of eggs by the imagines in the flight cage. The pieces of paper together with the eggs laid thereon are dipped into emulsions of Compound No. 1, respectively containing 250 and 125 p.p.m. Thereafter, the samples which have been treated in this way are kept open in a Petri half-dish in a climatic chamber under constant conditions (25° C., 70–75% relative atmospheric humidity, illumination about 4000 lux, 16 hours Dans) until the untreated control has completely hatched.

The following percentage mortality figures for the eggs of *Prodenia litura* were found at the two concentrations of the preparation.

| Concentration, p.p.m.: | 250 | 125 | control |
|---|---|---|---|
| Mortality, percent: | 100 | 100 | 5 |

We claim:
1. A pesticidal preparation for combatting insects, arachnoids, nematodes, and ova which comprises, as the active component, a pesticidally effective amount of a formimido-ester from the group consisting of:

N-3-nitro-4-methyl phenyl formimido-ethyl ester,
N-2-cyano-4-methyl phenyl formimido-ethyl ester,
N-2-nitro-5-methyl phenyl formimido-ethyl ester,
N-2,3-dimethyl phenyl formimido-ethyl ester,
N-2,6-dimethyl phenyl formimido-ethyl ester and
N-2,4-dimethylphenyl formimido-ethyl ester together with a suitable carrier.

2. A method for combatting ova wherein the improvement consists essentially of applying as the pesticide a composition of claim 1.

3. A method of claim 1 wherein the pesticidal composition is employed in the gaseous or vaporized state.

References Cited

UNITED STATES PATENTS 2,909,553  10/1959  Stephens _____ 260—453

STANLEY J. FRIEDMAN, Primary Examiner

U.S. Cl. X.R.

424—327; 260—453, 566